United States Patent [19]
Gunji et al.

[11] Patent Number: 5,731,838
[45] Date of Patent: Mar. 24, 1998

[54] APPARATUS FOR DECODING MOVING PICTURE DATA

[75] Inventors: Hiroshi Gunji, San Jose, Calif.; Takashi Nakamoto, Kodaira, Japan; Masuo Oku, Komakura, Japan; Yukiko Midorikawa, Higashi-murayama, Japan; Hironori Kojima, Kodaira, Japan

[73] Assignee: Hitachi, Ltd., Tokyo, Japan

[21] Appl. No.: 588,686

[22] Filed: Jan. 19, 1996

[30] Foreign Application Priority Data

Jan. 30, 1995 [JP] Japan ................................ 7-012827

[51] Int. Cl.$^6$ ........................................ H04N 7/32
[52] U.S. Cl. .................... 348/415; 348/699; 348/718
[58] Field of Search ................................ 348/384, 390, 348/400–402, 405, 407, 409–413, 415, 416, 420, 699, 714, 716, 718, 904; 382/232, 236, 238; H04N 7/137

[56] References Cited

U.S. PATENT DOCUMENTS

| | | | |
|---|---|---|---|
| 4,591,908 | 5/1986 | Hirano | 348/420 |
| 4,661,849 | 4/1987 | Hinman | 348/416 |
| 4,980,765 | 12/1990 | Kudo et al. | 348/716 |
| 5,136,371 | 8/1992 | Savatier et al. | 348/409 |
| 5,278,647 | 1/1994 | Hingorani et al. | 348/416 |
| 5,398,079 | 3/1995 | Liu et al. | 348/718 |
| 5,442,402 | 8/1995 | Sohn et al. | 348/716 |
| 5,469,228 | 11/1995 | Kim et al. | 348/716 |

OTHER PUBLICATIONS

"ISO/IEC, 'Information Technology–Generic Coding of Moving Pictures and Associated Audio Information'", ISO–IEC CD13818–2, 1995.

*Primary Examiner*—Richard Lee
*Attorney, Agent, or Firm*—Antonelli, Terry, Stout & Kraus, LLP

[57] ABSTRACT

In a moving picture data decoding apparatus, the storage of reference picture data in a picture memory is executed by dividing the picture memory into two memory areas. An address generator generates an address so that the reference picture data adjacent to the division may be doubly written into the two memory areas. As a result, the processing can be effected in a predetermined access time period irrespective of the read-out location.

5 Claims, 6 Drawing Sheets

(a) PICTURE DATA (b) MEMORY

PREVIOUS REFERENCE PICTURE

PRESENT PICTURE

APPARATUS FOR DECODING MOVING PICTURE DATA

BACKGROUND OF THE INVENTION

The present invention relates to a moving picture data decoding apparatus and, more particularly, to a method for controlling the memory access thereof.

Particularly in a moving picture data decoding apparatus or the like for decoding data which are encoded with high efficiency, it is necessary to have picture memory access for controlling the read/write of reference picture data.

The motion compensation (MC) is used as a method for improving the encoding efficiency in the encoding of moving pictures with high efficiency and is adopted in the MPEG (i.e., Moving Pictures Expert Group) or the international standard scheme for encoding moving pictures with high efficiency.

Incidentally, the detail of the MPEG is described in the following Reference I:

I: "ISO/IEC, 'Information Technology - Generic Coding of Moving Pictures and Associated Audio Information', ISO/IEC CD13818-2, 1993.11".

FIG. 8 is a diagram for explaining the aforementioned moving compensation method. In this moving compensation method, as shown by (A) in FIG. 8, the present picture screen when encoding is carried out is divided into macro blocks composed of predetermined pixels of vertical- and lateral-directions on the encoder side.

Next, each macro block (e.g., a portion (A') having the smallest difference ont of the reference picture data of the already encoded picture screen, concerning a portion (A) in FIG. 8) is looked for, and a moving vector (B) representing the location on the picture screen and the difference picture data between (A) and (A') are transmitted from the encoder side to the decoder side.

On the decoder side, the reference picture data are stored in the picture memory, and the reproduced picture data can be generated by reading the corresponding picture data out of the reference picture data in accordance with the moving vector (B) and by adding the read-out data to the difference picture data.

In other words, the decoder side is required to have a picture memory for holding the reference picture data and the whole picture data.

FIG. 9 is a diagram for explaining the picture memory on the decoder side. As shown in FIG. 9, the picture memory on the decoder side has two areas (MA, MB) for holding the whole picture data. Specifically, the moving picture data decoding apparatus utilizes those two memory areas (MA, MB) for storing the previous reference picture data and the reproduced picture data which are generated by reading out the picture data in accordance with the moving vector and by adding them to the difference picture data.

Thus, in either of these two areas (MA, MB), the reproduced picture data are stored, and the data are used as the reference picture data for the succeeding picture data.

In this case, the picture data of one line of horizontal direction are conventionally stored at the same Row address on the picture memory because the address calculation is easy and the read-out speed is high.

Incidentally, in the MPEG, some reproduced picture data cannot be used as the reference picture data. Therefore, the picture memory on the decoder side shown in FIG. 9 is provided with an area (MC) for holding the reproduced picture data which cannot be the reference picture data.

SUMMARY OF THE INVENTION

As described above, the moving compensation method is required to have a picture memory on the decoder side for holding the reference picture data. However, when the size of a picture to be decoded is large, the picture data of one line of horizontal direction is difficult to allocate to the same Row address.

As shown in FIG. 10, therefore, the reproduced picture data have to be divided in the horizontal direction, and stored in the picture memory.

In Example 1 shown in FIG. 10, the picture screen is divided into righthand and lefthand halves, and these two half picture data are stored at different Row address in the same picture memory. In Example 2 shown in FIG. 10, the two righthand and lefthand picture data are stored in two different picture memories.

According to the method of Example 1 shown in FIG. 10, the picture data of nine words (each comprising 16 bits)× seventeen lines, shown in FIG. 11(a), are stored at different Row addresses in the picture memory, as shown in FIG. 11(b). When, however, the picture data of nine words x seventeen lines at the boundary portions of the division are red out at the moving compensation time, the Row addresses have to be switched between the two memory areas while data of one line is being read out.

Therefore, when the picture memory is constructed of a synchronous DRAM synchronizing with a clock signal, a useless cycle is required, as shown in FIG. 12. As a result, there arises a problem that the time required to access the picture memory is increased, and the time required for the moving compensation is increased. On the other hand, when the picture memory is constructed of a general purpose DRAM fed with no clock signal, a useless cycle is likewise required.

In Example 2 shown in FIG. 10, in order to read out one horizontal line, so-called bank switch is required for switching the two different picture memories from one to the other. This bank switch also requires the useless cycle.

The present invention has been made to solve the aforementioned problems of the prior art, and the object of the invention is to provide a technique for preventing an increase in the time period to access a picture memory even when reference picture data are divided and stored separately in a picture memory, and performing processings in a predetermined access time irrespective of the read-out location.

The foregoing and other objects and novel features of the present invention will become apparent from the following description to be made herein with reference to the accompanying drawings.

The summary of representatives of the invention to be disclosed herein will be briefly described in the following.

(1) In order that the picture data to serve as the reference picture at the moving compensation time may be divided and stored in a plurality of areas of a memory, and the picture data divided and stored in the memory areas may be read out, the picture data adjacent to the division are doubly written in two areas where the picture data before and after the division of the memory are stored. (2) In the aforementioned means (1), the number of horizontal words of the picture data to be doubly written into the two memory areas is an integral multiple of the number of horizontal words of a picture data block which is a processing unit for the moving compensation. (3) In the aforementioned means (1) or (2), the divided areas of the memory, in which the entirety of the block to be read out in the picture data is stored, are selected to read out the picture data from the selected memory area. (4) In the aforementioned means (3), the number of horizontal words of the data to be doubly written into the two memory areas is (w−1) where w is the number of words on the horizontal memory of the picture data block to be read out at the moving compensation.

According to the foregoing means, the reference picture data are divided into the righthand and lefthand halves and are stored in the individual picture memory areas, the several righthand and lefthand pixels at the division are doubly written into both the picture memory areas.

At the read-out time, on the other hand, out of the two picture memory areas, the picture memory area where one entire block to be read out can be selected to read out the picture data from the selected memory area.

As a result, when the reference picture is divided into two halves and stored in the two picture memories, the Row address conventionally has to be changed between the two memory areas so as to read out the picture data of one line. According to the aforementioned means, however, the picture data of one line can be read out from the selected one memory area without changing the Row address.

Thus, it is possible to prevent the time period required to access the picture memory from being made longer, thereby to perform processings in a constant time period irrespective of the read-out location.

DETAILED DESCRIPTION OF THE PREFERRED EMBODIMENTS

Figure 1:
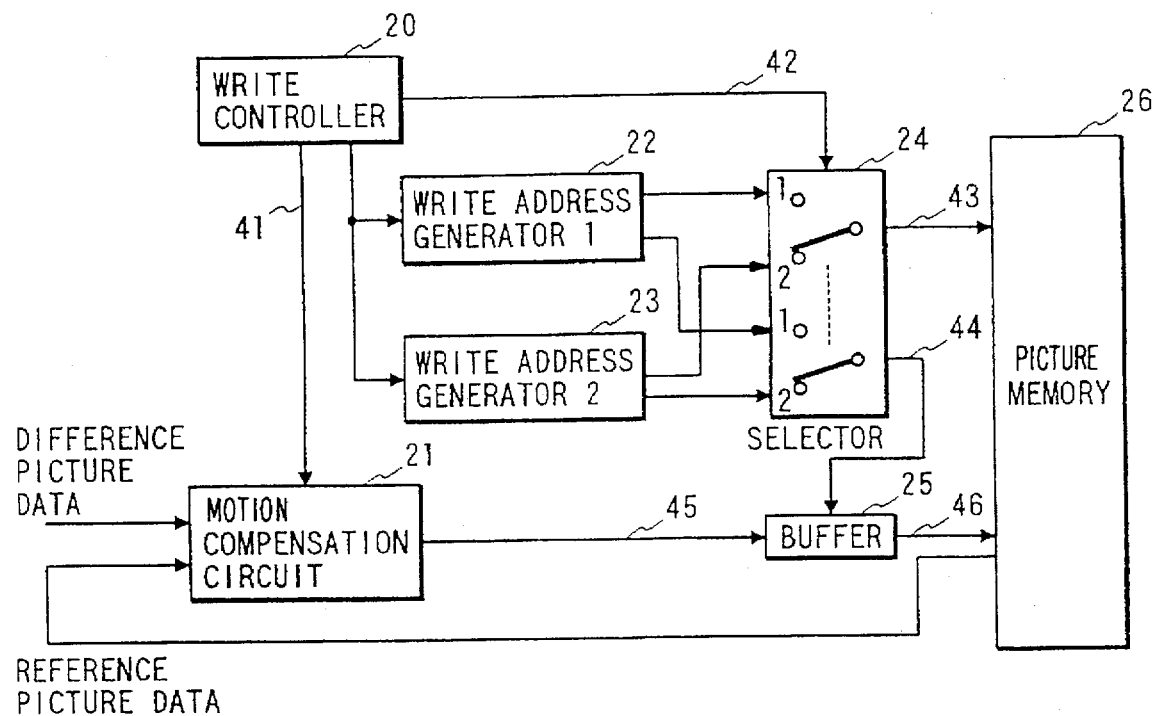
FIG. 1 is a diagram showing a circuit construction of a moving picture decoding apparatus of one embodiment of the present invention and showing the writing operation.

With reference to the accompanying drawings, embodiments of the present invention will be described in detail.

Incidentally, throughout the drawings for explaining the embodiments, the portions having identical functions will not be repeatedly explained by designating them using the same reference numerals.

[Embodiment 1]

FIG. 1 is a diagram showing a circuit construction of a moving picture data decoding apparatus of one embodiment (Embodiment 1) of the present invention.

In FIG. 1, reference numeral 20 designates a write controller, numeral 21 a moving compensation circuit, numerals 22 and 23 write address generators, numeral 24 a selector, numeral 25 a buffer, and numeral 26 a picture memory.

Figure 8:
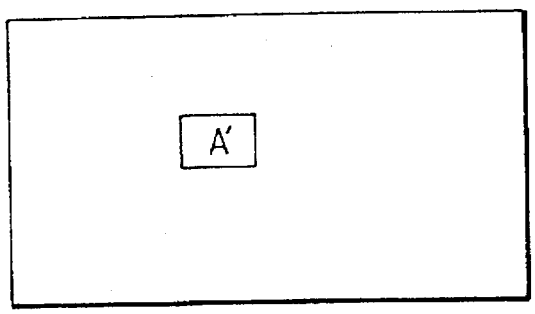
FIG. 8 is a diagram for explaining a moving compensation method.
Figure 8:
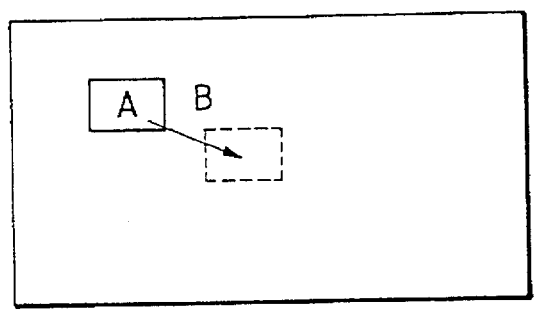

The moving compensation circuit 21 shown in FIG. 1 reproduces picture data 45 by adding the corresponding picture data in the reference picture data, read out from the picture memory 26 in accordance with the moving vector (designated by B in FIG. 8) sent from the encoder side, and the difference picture data sent from the encoder side.

In this case, the reference picture data or the reproduced picture data are alternatively stored in two areas (the areas MA and MB shown in FIG. 9) for holding the entire picture data of the picture memory 26. More specifically, for example, when the reference picture data are read out of the area MA of the picture memory 26 shown in FIG. 9, the reproduced picture data are stored in the area MB of the picture memory 26 shown in FIG. 9, and vice versa.

Incidentally, the reproduced picture data 45 reproduced by the moving compensation circuit 21 shown in FIG. 1 are once stored in the buffer 25.

In the memory write controller of the present embodiment 1, as has been described, the picture data of one horizontal line are halved and stored in the picture memory 26.

Specifically, when $0<x1<x2<x0$ where x is the abscissa of the reproduced picture data, the reproduced picture data of the area Ma1 in a range $0 \leq X < x2$ is written into the area Mb1 of the picture memory 26 whereas the reproduced picture data of the area Ma2 in a range $x1 \leq x < x0$ is written into the area Mb2 of the picture memory 26.

In this case, therefore, the picture data of the reproduced picture data in the area $x1 \leq x < x2$ where x is the abscissa, are doubly written into the areas Mb1 and Mb2 of the picture memory 26.

Figure 3:
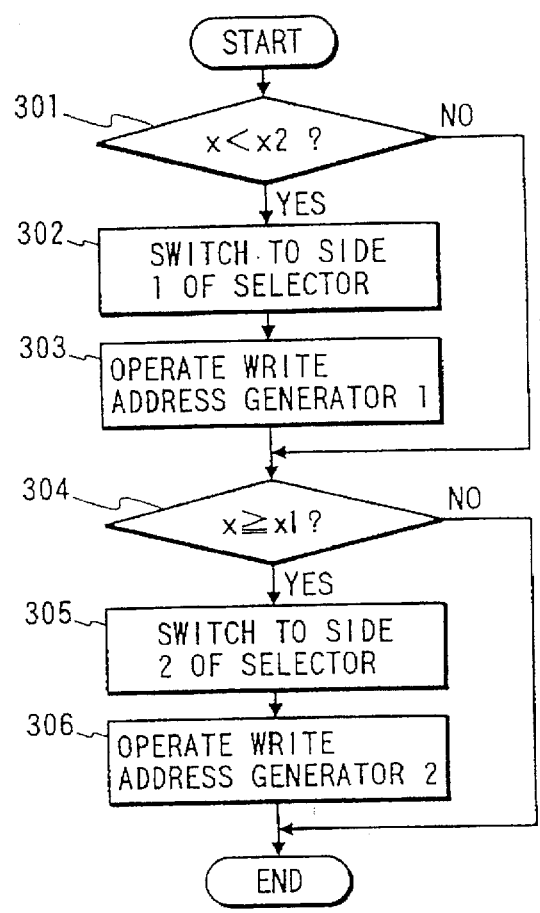
FIG. 3 is a flow chart showing the processing procedure of the writing operation of the moving picture data decoding apparatus of FIG. 1.

FIG. 3 is a flow chart showing the processing procedure of the write controller 20 shown in FIG. 1.

This write controller 20 operates in accordance with the flow chart shown in FIG. 3 on the basis of the abscissa x of the reproduced picture data. This write controller 20 can be constructed of either a dedicated hardware or a CPU operating in accordance with the stored program.

Next, the processing procedure of the write controller 20 shown in FIG. 1 will be described with reference to the flow chart shown in FIG. 3.

First, it is judged at Step 301 whether or not the abscissa x of the reproduced picture data is less than x2. If the result is NO, the procedure is skipped to Step 304.

If it is judged at Step 301 that the abscissa x is less than x2, on the other hand, the selector 24 is switched over to the side 1. After this, a write address generator 1 (22) is operated at Step 303.

This write address generator 1 (22) generates an address for writing the reproduced picture data into the area Mb1 of the picture memory 26 shown in FIG. 2(b).

An address 43 is sent from the write address generator 1 (22) through the selector 24 to the picture memory 26, and a read timing signal is sent to the buffer 25, so that the reproduced picture data 46 from the buffer 25 are written into the picture memory 26 of a synchronous DRAM in synchronism with the clock.

Next, it is judged at Step 304 whether or not the abscissa x of the reproduced picture data is equal to or more than x1. If the result is NO, the procedure is ended.

If the abscissa x is less than x1, on the other hand, the selector 24 is switched over to the side 2 at Step 305, and a write address generator 2 (23) is then operated at Step 306.

This write address generator 2 (23) generates an address for writing the reproduced picture data into the area Mb2 of the picture memory 26 shown in FIG. 2(b).

Thereafter, the reproduced picture data 46 from the buffer 25 are written into the picture memory 26 as in the foregoing case.

When the processing described above is ended, the write controller 20 outputs the signal to be written into the buffer 25, through a signal line 41 to the moving compensation circuit 21, and the processing shifts to the operation for the subsequent picture data.

Figure 2:
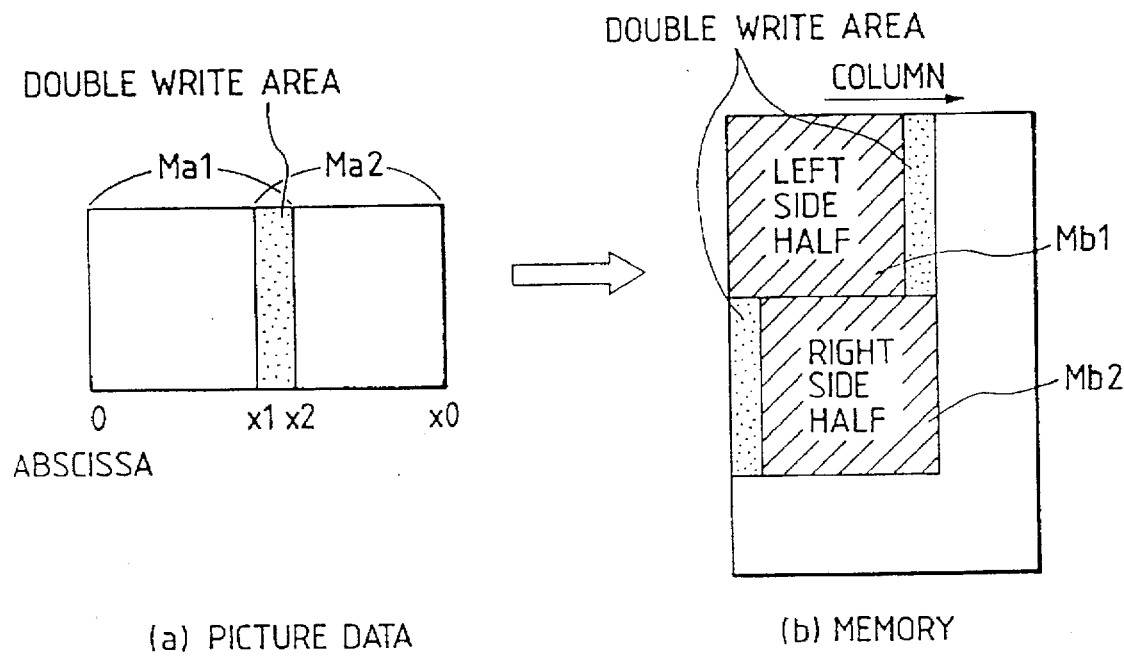
FIG. 2 is a diagram showing one example of a picture memory storing area for storing the picture data in the embodiment 1.

As a result, the pixels in the area $0 \leq x < x1$ are written into only the area Mb1 of the picture memory 26 shown in FIG. 2(b), the pixels in the area $x2 \leq x < x0$ are written into only the area Mb2 of the picture memory 26 shown in FIG. 2(b), and the pixels in the area $x1 \leq x < x2$ are written into both the areas of the picture memory 26, thereby to achieve the write, as shown in FIG. 2.

[Embodiment 2]

Figure 4:
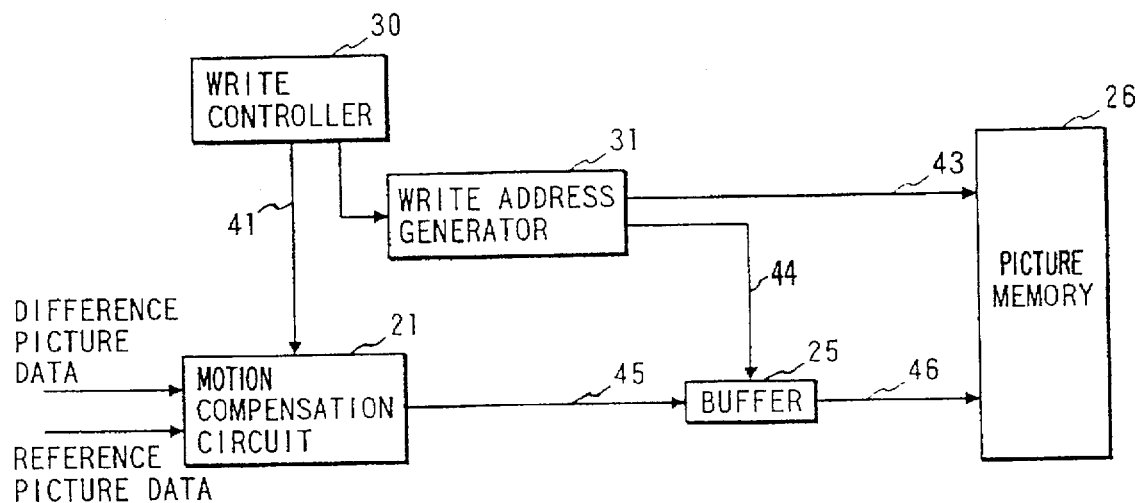
FIG. 4 is a diagram showing a circuit construction of a moving picture decoding apparatus of another embodiment of the present invention and showing the writing operation.

FIG. 4 is a diagram showing a circuit construction of a moving picture data decoding apparatus of another embodiment (Embodiment 2) of the present invention.

In FIG. 4, reference numeral 21 designates a moving compensation circuit, numeral 25 a buffer, numeral 26 a picture memory, numeral 30 a wrote controller, and numeral 31 a write address generator.

In this Embodiment 2, the picture data 45 generated by the moving compensation circuit 21 are once stored in the buffer 25 as in the foregoing Embodiment 1.

Figure 5:
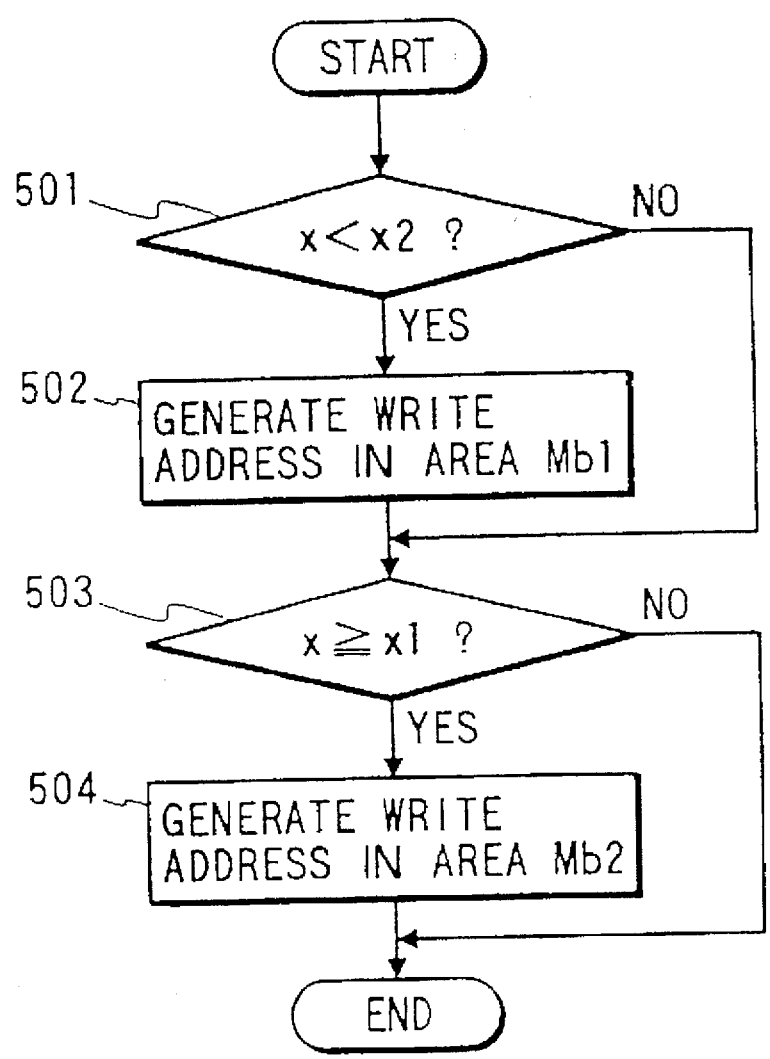
FIG. 5 is a flow chart showing the processing procedure of the writing operation of the moving picture data decoding apparatus of FIG. 1.

The write controller 30 operates in accordance with the flow chart shown in FIG. 5, on the basis of the abscissa x of the picture data generated.

Next, the processing procedure of the write controller 20 shown in FIG. 4 will be described with reference to the flow chart shown in FIG. 5.

First, it is judged at Step 501 whether or not the abscissa x is less than x2. If this result is NO, the procedure moves to Step 503.

If it is judged at Step 501 that the value x is less than x2 at Step 502, the write address generator 31 is controlled so that the reproduced picture data may be written into the area Mb1 of the picture memory 26 shown in FIG. 2(b), and the write address generator 31 generates an address for writing the reproduced picture data in the area Mb1 of the picture memory 26 shown in FIG. 2(b).

The address 43 is sent from the write address generator 31 to the picture memory 26, and the read timing signal is sent to the buffer 25, so that the reproduced picture data 46 from the buffer 25 are written into the picture memory 26, i.e., the synchronous DRAM, in synchronism with the clock.

Next, it is judged at Step 503 whether the abscissa x is equal to or more than x1. If this result is NO, the procedure is ended.

If the abscissa x is equal to or more than x1, at Step 504, the write address generator 31 is controlled so that the reproduced picture data may be written into the area Mb2 of the picture memory 26 shown in FIG. 2(b), and the write address generator 31 generates the address for writing the reproduced picture data into the area Mb2 of the picture memory 26 shown in FIG. 2(b).

Thereafter, the reproduced picture data 46 from the buffer 25 are written into the picture memory 26 as in the foregoing case.

When all the processings are ended, the write controller 30 outputs the write signal for the buffer 25 to the moving compensation circuit 21, and the procedure moves to the processing of the next picture data.

Incidentally, the write into the picture memory 26 in the foregoing Embodiment 1 and Embodiment 2 need not be executed in units of one word. In the MPEG, for example, the macro block or the decoding unit is composed of sixteen pixels x sixteen lines. Therefore, the picture data of sixteen pixels (eight words) x sixteen lines can be stored in the buffer 25 and the sixteen pixels (eight words) can be written by a single writing operation. Thus, the number of address designations or the like decreases, so that the time period required for the writing procedure can be shortened.

In this case, for effecting the writing operation shown in FIG. 2, both the values x1 and x2 have to be integral multiples of sixteen which is the number of pixels (eight words) of the width of the micro block.

[Embodiment 3]

Figure 6:
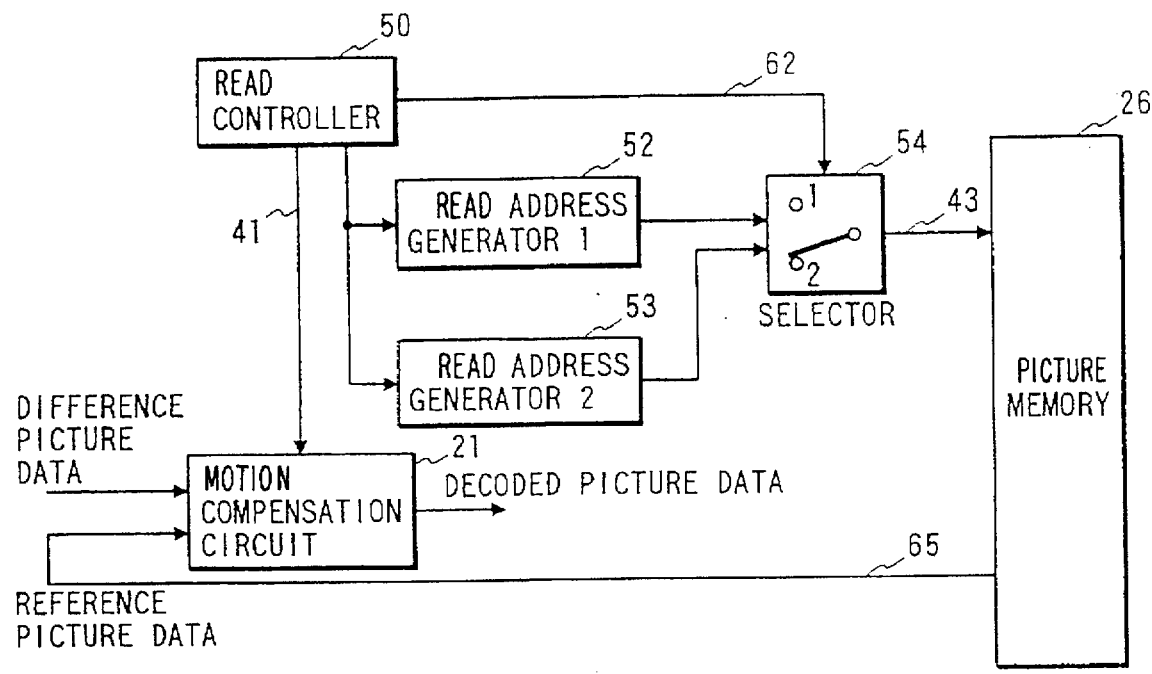
FIG. 6 is a diagram showing a circuit construction of a moving picture decoding apparatus of another embodiment of the present invention and showing the reading operation.

FIG. 6 is a diagram showing a circuit construction of a moving picture data decoding apparatus of another embodiment (Embodiment 3) of the present invention.

In FIG. 6, reference numeral 21 designates a moving compensation circuit, numeral 26 a picture memory, numeral 50 a read controller, numerals 52 and 53 read address generators, and numeral 54 a selector.

In the present Embodiment 3, the picture data are bisected, as shown in FIG. 2.

If, moreover, the number w of horizontal pixels (words) to be read out for processing the signal at the moving compensation time should satisfy the relation of $x2-x1 \leq w-1$. In the following description, $x2-x1=w-1$.

In the read controller 50 of the present Embodiment 3, it is determined on the basis of the position of the picture data block to be read out which of the read address generators 1 and 2 (52, 53) is to be operated.

The read address generator 1 (52) is a circuit for generating an address for reading out the area Mb1 of the picture memory 26 shown in FIG. 2(b); and the read address generator 2 (53) is a circuit for generating an address for reading out the area Mb2 of the picture memory 26 shown in FIG. 2(b).

In the present Embodiment 3, the address generator 1 operates for $x < x1$ where x is the abscissa at the lefthand end of the block to be read out; whereas the address generator 2 operates for $x \geq x1$.

For $x < x1$, therefore, the read-out range is from x to $(x+w) < x2$, so that the read-out can be executed for only the area Mb1 of the picture memory 26 shown in FIG. 2(b).

Likewise for $x \geq x1$, all the picture data to be read out are written into the area Mb2 of the picture memory 26 shown in FIG. 2(b). Hence the reference picture data can be read out without any access to the two.

As a result, even when the reference picture is divided and separately stored in the picture memory 26, the picture data for the moving compensation can be read out in the same time period as that of the case of no division.

[Embodiment 4]

Figure 7:
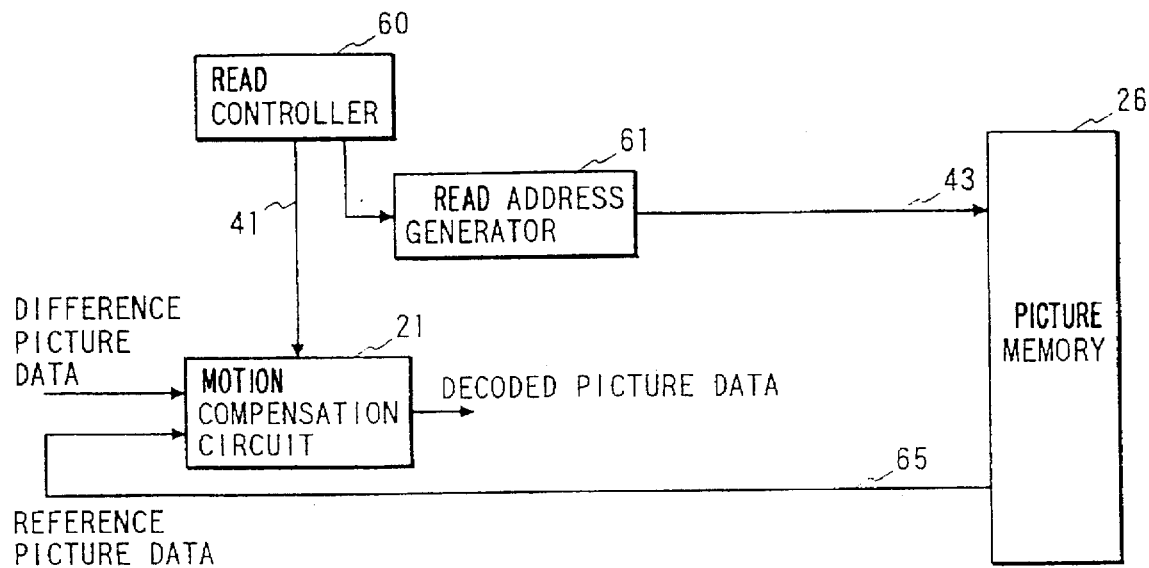
FIG. 7 is a diagram showing a circuit construction of a moving picture decoding apparatus of another embodiment of the present invention and showing another example of a read controller.

FIG. 7 is a diagram showing a circuit construction of a moving picture data decoding apparatus of another embodiment (Embodiment 4) of the present invention.

In FIG. 7, reference numeral 21 designates a moving compensation circuit, numeral 26 a picture memory, numeral 60 a read controller, and numeral 61 a read address generator.

The present Embodiment 4 is different from the Embodiment 3 in that the selector 54 is omitted and the two read address generators (52, 53) are replaced by a single read address generator 61 so that the two areas of the picture memory 26 may be read out by the read address generator 61.

Incidentally, the other points are similar to those of the Embodiment 3. Therefore their detailed description will be omitted.

The read controller 60 of the Embodiment 4 designates the read address generator 61 on the basis of the location of the picture data block to be read out so that the area Mb1 at (b) in FIG. 2 may be read out for x<x1 where x is the lefthand end abscissa of the block to be read out, whereas the area Mb2 of FIG. 2(b) may be read out for x≧x1.

Thus, in the present Embodiment 4, too, the range to be read out is from x to (x+w)<x2 for x<x1, so that only the area Mb1 of the picture memory shown in FIG. 2(b), can be read out.

Likewise for x≧x1, the picture data are written in the area Mb2 of the picture memory 26 shown in FIG. 2(b), so that the reference picture data can be read out without any simultaneous access to both the two.

As a result, even when the reference picture is divided and stored in the picture memory 26, the picture data for the compensation can be read out for the same time period required as that of the case where the reference picture is not divided.

Generally speaking, as also seen in the MPEG, for example, some reproduced picture data can be later reference picture, but the others cannot.

Figure 9:
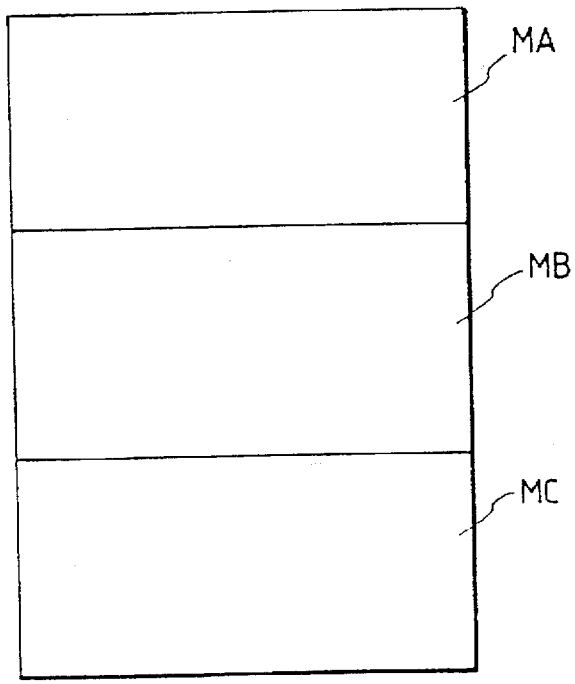
FIG. 9 is a diagram for explaining a decoder side picture memory when the moving compensation method is adopted.

In this case, these reproduced picture data which cannot be the later reference picture are stored, as shown in FIG. 9 in an area MC of the picture memory 26 different from the areas MA and MB where the reproduced picture data which can be the later reference picture are stored. Despite of this fact, however, the access controller can be used commonly by performing the aforementioned memory access control irrespective of whether or not the reproduced picture data might be the reference picture.

For the picture data which cannot be the reference picture, on the other hand, the capacity of the picture memory 26 to be used for storing the picture data can be reduced if the access to be made is such that the aforementioned double write is not performed.

Although the present invention has been specifically described in connection with its embodiments, it should not be limited thereto but can naturally modified in various manners without departing from the gist thereof.

Figure 10:
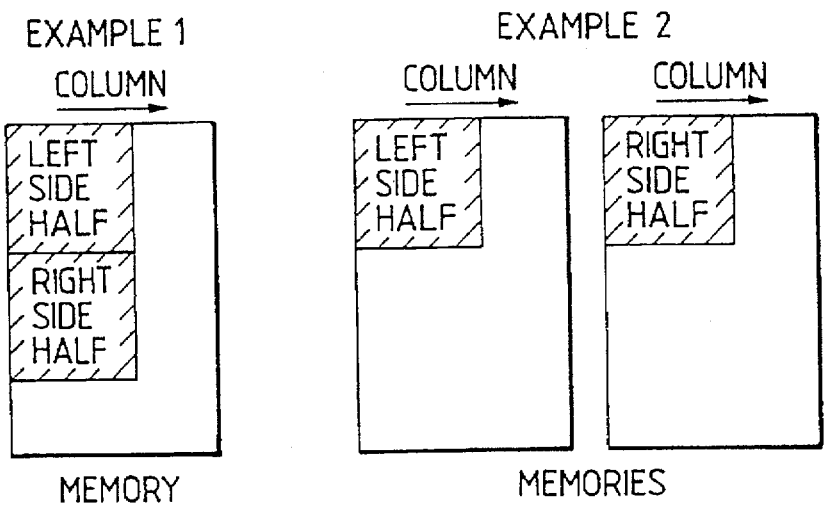
FIG. 10 is a diagram for explaining a method of storing the picture data in the picture memory in accordance with a conventional method.
Figure 11:
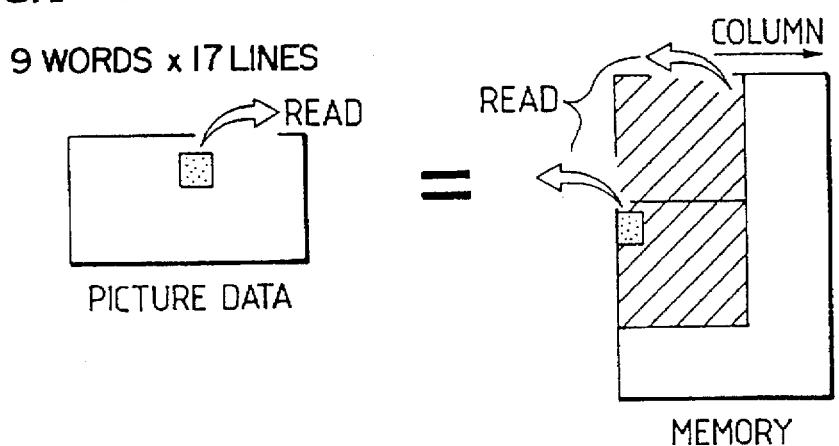
FIG. 11 is a diagram for explaining the read-out of the picture data in accordance with the conventional method.
Figure 12:
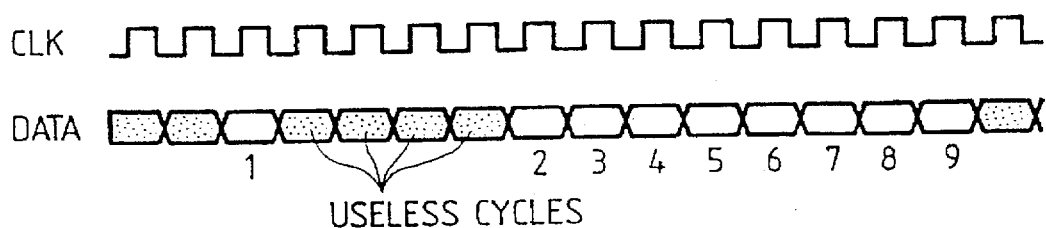
FIG. 12 is a diagram for explaining the picture data read-out timing in accordance with the conventional method.

In the foregoing embodiments, for example, the reproduced picture data are divided into the right and left halves and are stored in the different Row addresses in the upper and lower portions of the single memory array. However, these two halved right and left picture data may be stored at different bank addresses in the two memory banks, as exemplified in the Example 2 of FIG. 10. In this case, it is needless to say that the so-called "bank switch" is unnecessary for reading one horizontal line.

The effects obtained by the representative of the invention disclosed herein will be briefly described in the following.

According to the present invention, even when the reference picture is divided and stored in the picture memory, it is possible to prevent the time period required to access the picture memory from being increased, thereby to make the access time period constant irrespective of the read-out location.

As a result, the processing time period for the moving compensation can be prevented from being increased, to speed up the moving compensation.

What is claimed is:

1. A moving picture data decoding apparatus comprising:

a memory for storing reference picture data;

a motion compensation circuit for generating reproduced picture data by adding difference picture data and the reference picture data read out from said memory in accordance with a motion vector; and an address generator for generating addresses used when the reproduced picture data generated by said motion compensation circuit are written into said memory as new reference picture data;

wherein said reference picture data are divided and stored in at least two memory areas of said memory; and wherein said address generator generates addresses for a portion of said reference picture data where said reference picture data is divided so that said portion of said reference picture data is written into both of said two memory areas, whereby said portion of said reference picture data is stored twice in said memory.

2. A moving picture data decoding apparatus according to claim 1, wherein said address generator generates addresses so that one of said two memory areas where an entire reference picture data block to be read out from said memory is stored is selected and said entire reference picture data block is read out from said selected one of said two memory areas.

3. A moving picture data decoding apparatus according to claim 1, wherein a number of words in a horizontal direction of the reference picture data to be written into both of said two memory areas is (w−1), where w is a number of words on a horizontal memory of a reference picture data block to be read out at motion compensation.

4. A moving picture data decoding apparatus according to claim 1, wherein a number of horizontal words of the reference picture data to be written into both of said two memory areas is an integral multiple of a number of words of a reference picture data block of a processing unit in a horizontal direction for motion compensation.

5. A moving picture data decoding apparatus according to claim 4, wherein said address generator generates addresses so that one of said two memory areas where an entire reference picture data block to be read out from said memory is stored is selected and said entire reference picture data block is read out from said selected one of said two memory areas.

* * * * *